United States Patent
Padiyar et al.

(10) Patent No.: US 12,106,431 B2
(45) Date of Patent: Oct. 1, 2024

(54) METAVERSE ENHANCED SAFE DEPOSIT BOX

(71) Applicant: Bank of America Corporation, Charlotte, NC (US)

(72) Inventors: Sneha Padiyar, Mumbai (IN); Nandini Rathaur, Mumbai (IN); Sandeep Kumar Chauhan, Hyderabad (IN); Aditya Sharma, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 189 days.

(21) Appl. No.: 18/070,797

(22) Filed: Nov. 29, 2022

(65) Prior Publication Data

US 2024/0177413 A1     May 30, 2024

(51) Int. Cl.
| | |
|---|---|
| *G06T 17/00* | (2006.01) |
| *G06F 21/31* | (2013.01) |
| *G06F 21/62* | (2013.01) |
| *G06T 13/40* | (2011.01) |
| *G06V 10/141* | (2022.01) |

(52) U.S. Cl.
CPC .............. *G06T 17/00* (2013.01); *G06F 21/31* (2013.01); *G06F 21/6245* (2013.01); *G06T 13/40* (2013.01); *G06V 10/141* (2022.01)

(58) Field of Classification Search
None
See application file for complete search history.

(56) References Cited

U.S. PATENT DOCUMENTS

| | | | |
|---|---|---|---|
| 2023/0319030 A1* | 10/2023 | Young | G06F 3/0482 726/6 |
| 2023/0372830 A1* | 11/2023 | Gillis | A63F 13/79 |
| 2024/0118784 A1* | 4/2024 | Wang | G06F 3/0484 |
| 2024/0146699 A1* | 5/2024 | Jayaraman | G06T 17/00 |

\* cited by examiner

*Primary Examiner* — Peter Hoang
(74) *Attorney, Agent, or Firm* — Weiss & Arons LLP

(57) ABSTRACT

Systems, methods, and apparatus are provided for safe deposit box protocols in a metaverse environment. A metaverse application may enable interactions between an agent avatar and a customer avatar in a secure bidirectional metaverse session. Customer identity may be verified using meta-information associated with avatar appearance or behavior, device data, and/or methods of avatar control. The customer avatar may view a virtual representation or video stream of physical safe deposit box contents in the metaverse environment. In some embodiments, the customer avatar may request a camera adjustment at the physical safe deposit box. In some embodiments, the customer avatar may sign a virtual document in the metaverse environment. The signature may be captured and reproduced on a paper document by a device interfacing with the metaverse application. The metaverse application may store technical logs of the metaverse session for future reference.

21 Claims, 7 Drawing Sheets

METAVERSE ENHANCED SAFE DEPOSIT BOX

FIELD OF TECHNOLOGY

Aspects of the disclosure relate to metaverse interactions.

BACKGROUND OF THE DISCLOSURE

Safe deposit box transactions typically require a customer to appear in person at a banking center. Under typical security protocols, banking employees may not be able to access a safe deposit box on behalf of a customer without the customer present.

The metaverse is a virtual shared space that is accessed via the internet. In its broadest form, the metaverse may encompass the entire social and economic structure that exists in both the actual and virtual worlds. Avatars, content, and goods may all travel around freely.

In the metaverse, a virtual world experience may be created by simulating human emotions and gestures. Individuals in the metaverse may communicate and transact with each other and with digital 3D items.

It would be desirable to use a secure metaverse session to virtually replicate in-person access to a safe deposit box. It would further be desirable to leverage aspects of the metaverse interaction itself to authenticate a user.

SUMMARY OF THE DISCLOSURE

Systems, methods, and apparatus for safe deposit box protocols in a metaverse environment are provided.

A metaverse application may maintain a secure bidirectional metaverse session. The session may include a metaverse environment. A first avatar and a second avatar may interact in the metaverse environment. The first avatar may be controlled via input at a first user device and the second avatar controlled via input at a second user device.

The metaverse application may authenticate the first avatar in the metaverse environment. The metaverse application may render a first virtual representation of physical contents of a safe deposit box in the metaverse environment for viewing by the first avatar.

The metaverse application may receive an instruction from the avatar in the metaverse environment. The instruction may be based on input at the user device. The metaverse application may render a second virtual representation of the physical contents of the safe deposit box. The metaverse application may store a record of the metaverse session in a computer memory.

The metaverse application may interface with a camera on an interior surface of the safe deposit box. The camera may be adjusted in real time in response to the instruction from the first avatar. The metaverse application may store a record of the metaverse session in a computer memory.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
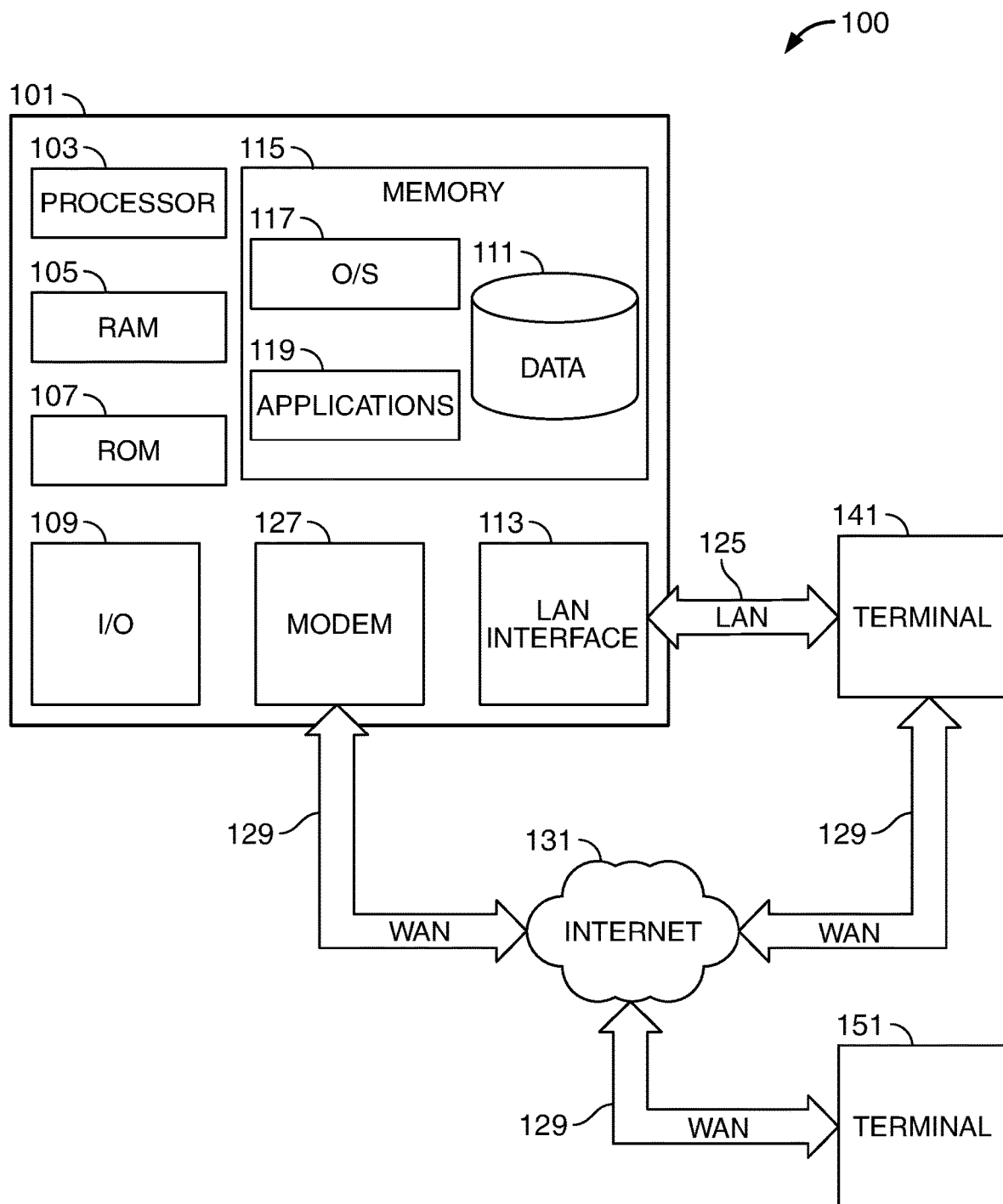
FIG. 1 shows illustrative apparatus in accordance with principles of the disclosure.

Systems, methods, and apparatus for safe deposit box protocols in a metaverse environment are provided.

For the sake of illustration, the invention will be described as being performed by a "system." The system may include one or more features of apparatus and methods that are described herein and/or any other suitable device or approach.

Safe deposit box transactions may require in-person interactions between an agent and a customer. The system may enable interactions between the parties in a secure metaverse session. The system may authenticate one or both parties based on features of the metaverse interaction.

A financial institution customer may register for metaverse interactions with the financial institution. In some embodiments, a customer may automatically be registered for metaverse interaction and may opt out if desired. Registration may be associated with opening an account at the financial institution, with acquiring a safe deposit box, or with initiating any suitable financial service.

Customer registration or opt-out may be received at a banking center, at a financial institution portal, at a mobile device application, via telephone, or via any suitable method. A customer may communicate with a mobile device application using an interactive response system, via a live agent interaction, or via any suitable method. Customer registration or opt-out data may be stored in a reference database associated with the financial institution.

In some embodiments, a customer device may be registered with the financial institution for metaverse interaction. Customer device data may be stored in the reference database. Customer device data may be stored in association with customer account data. Customer device registration may include download or installation of software for secure metaverse access.

A customer may reach out to an agent to initiate a safe deposit box transaction. For example, a customer may want to view items previously stored in the safe deposit box. The agent may transmit a link to the customer. The link may be encoded for access to a metaverse session. The link may be transmitted to a customer mobile application on a customer device. Alternatively, the link may be transmitted by email, accessed on a web portal, or communicated by any suitable method. The link may be incorporated into a graphic.

A metaverse application may initiate and maintain the metaverse session. The metaverse application may be associated with a financial institution. Client devices on the agent side and the customer side may interface with the metaverse application.

The customer may use the link to access a bidirectional, secure metaverse session. The customer may log into the metaverse session using a digital avatar. The digital avatar may be registered to the customer.

The system may leverage aspects of the metaverse interaction for streamlined verification of user identify. For example, the system may verify the identity of the customer by authenticating the customer avatar.

Authentication of a customer avatar in the metaverse environment may be based on meta-information associated with the avatar. Authentication may be based on one or more features associated with the avatar appearance. The avatar may be preregistered with the financial institution and avatar details may be stored in association with a customer account. In some embodiments, avatar details may be recorded in the course of metaverse interactions with a customer and stored for future reference.

In some embodiments, authentication of a customer avatar may be based on metadata associated with a customer device used to control the avatar. The device may be preregistered with the financial institution and device information may be stored in association with a customer account. In some embodiments, a device token may be used for authentication. In some embodiments, device details may be recorded in the course of metaverse interactions with a customer and stored for future reference.

In some embodiments, authentication of the avatar may be based on historical modes of controlling the avatar. For example, authentication may be based on a method of interaction with the device used to control the avatar. In some embodiments, these control methods may be recorded in the course of metaverse interactions with a customer and stored for future reference. A user may control the avatar using touch-based input, touch-free input, and/or a combination of touch-based and touch-free inputs.

In some embodiments, user inputs may be hands-on. Hands-on user input may be received via keystrokes on a keyboard, buttons on a surface of the device, movement of an input device such as a joystick, use of a stylus, or by any suitable method. User input may be received via a device touch screen. Touch-based gestures may include swiping, tapping, squeezing and any other suitable touch-based gestures or combination of touch-based gestures.

In some embodiments, user inputs may be hands-free. Hands-free input may include voice commands, gesture recognition, eye tracking or any other suitable method. Gesture recognition may include air-based hand and/or body gestures. Air-based gestures may be performed without touching the device.

A user device may include one or more sensors. Illustrative sensors may include a touch screen, camera, accelerometer, gyroscope, and any other suitable sensors. Sensors may detect hands-free input such as air gestures or eye movement.

A touch-sensitive screen may capture finger motions. The device may include specialized software executable by the device microprocessor for automatic conversion of finger motions as they are input by the user on the touch-sensitive screen.

The touch-sensitive screen may utilize resistive touch technology to detect user touch points. Screens constructed using resistive touch technology include an upper layer (which is touched by the user) spaced apart from a bottom layer. When the user touches the screen, the upper layer contacts the bottom layer, generating an electrical signal. Screens constructed using resistive touch technology only require the application of pressure and do not require application of heat or electrical charge to detect a touch point. Resistive-touch technology is also relatively less expensive than other touch sensing technologies.

The touch-sensitive screen may utilize capacitive touch technology to detect user touch points. Screens constructed using capacitive touch technology may identify touches points by detecting an electrical disturbance created when the user touches the screen. The human body is an electronical conductor and, contact with another conducting surface such as the surface of a touch-sensitive screen, typically generates a detectable electrical disturbance. Capacitive touch technology detects the electrical disturbance and determines where on the screen the user touched.

The touch-sensitive screen may utilize any suitable touch detection technology such as surface acoustic wave, optical imaging, infrared acrylic projection or acoustic pulse recognition technologies.

A user device may include a touch-sensing controller for detecting a touched location. The touch-sensing controller may include an application-specific integrated circuit (ASIC) chip and a digital signal processor (DSP) chip.

In some embodiments, the touch-sensitive screen may provide "single-touch" functionality. In some embodiments, the touch-sensitive screen may provide "multi-touch" functionality. Single-touch functionality may detect input from one user touch on the touch-sensitive screen. Single-touch functionality may also recognize double finger taps or a long-press functionality. Multi-touch functionality may detect input from two or more simultaneous user touch points on the touch-sensitive screen. For example, a pinch-to-zoom feature is a multi-touch functionality.

The user device may include a haptic response system. The haptic response system may provide a responsive force, vibration or movement in response to receiving a user's touch input. For example, the haptic response system may provide a responsive vibration to a user's touch-based selection of a payment option. The haptic response system may include an eccentric (unbalanced) rotating mass, a linear resonant actuator, a piezoelectric actuator or any other suitable hardware for providing a haptic response.

The user device may include smart glasses or a virtual reality headset. The smart glasses or virtual reality headset may be used alone or in combination with another device.

The customer avatar may interact with an agent avatar in the metaverse environment. The metaverse environment may simulate a banking center environment or any suitable environment.

In the course of a metaverse interaction, the customer avatar may request to view the contents of a safe deposit box. The customer avatar may view contents in the metaverse environment. In some environments, the virtual contents may be screened from view by the agent avatar.

The safe deposit box may include one or more cameras. The camera may be mounted in a corner of the box or in any suitable location. The camera may capture a view of the box contents. The camera may be configured to capture video. Sensors and actuators associated with the camera may adjust position of the camera, focus of the camera, or any suitable camera parameters. The camera may be optimized for a low light environment. The camera may be adjusted automatically in response to parameters of the environment detected by the sensors. The camera may be adjusted in response to instructions from a customer avatar or agent avatar.

The safe deposit box may include one or more light sources. The light source may be located at any suitable location within the safe deposit box. The light source may be integrated into the structure of the box. Sensors and actuators associated with the light source may adjust the level of brightness, the position of the light source, or any suitable parameter. The light source may be adjusted automatically in response to parameters of the environment detected by the sensors. The light source may be adjusted in response to instructions from a customer avatar or agent avatar.

The safe deposit box may be customized with internal structure to position the contents for capture by the camera. The internal structure may be adjustable. Sensors and actuators associated with the internal structure may adjust partitions to widen or narrow compartments and may raise, lower, or rotate portions of the structure to provide a camera with an enhanced view of items within the box. The internal structure may be adjusted automatically in response to parameters of the environment detected by the sensors. The internal structure may be adjusted in response to instructions from a customer avatar or agent avatar.

In some embodiments, the contents of the box may be digitally rendered in the metaverse environment in real time. The rendering may be based on images captured by a camera. Sensors and actuators may adjust cameras, lighting, and/or internal structure of the safe deposit box to capture different angles of the object for rendering. The customer avatar may interact with the digitally rendered items. For example, the customer avatar may lift or rotate the digitally rendered items.

In some embodiments, a live video feed from the camera may be streamed in the metaverse environment for viewing by the customer avatar. In some embodiments, a set of static images may be captured by a camera and displayed to the customer avatar in the metaverse environment.

The system may capture a request from the customer avatar to adjust a camera in the safe deposit box. The system may transmit the request to the camera. The camera and/or an actuator associated with the camera may interface directly with a metaverse application.

The system may capture a request from the customer avatar to adjust the light in the safe deposit box. The light source and/or an actuator associated with a light source may interface directly with the metaverse application. The system may capture a request from the customer avatar to adjust the position of an object in the box. The box and/or an actuator associated with the internal structure of the box may interface directly with the metaverse application.

The agent avatar may explain aspects of the safe deposit box transaction to the customer avatar. The agent avatar may inform the customer avatar of rules or policies associated with the safe deposit box. The system may render a virtual document for viewing by the agent avatar and the customer avatar, such as a contract or consent form. The agent avatar may explain aspects of the document to the customer avatar. The customer avatar may provide a virtual signature. The system may render the virtual signature of the customer avatar on the virtual document.

The system may capture the document signature. In some embodiments, the signature may be inserted into a digital scan of the document. In some embodiments, the system may transmit the captured signature to a printing device. The printing device may interface directly with a metaverse application. The printing device may reproduce the signature on a copy of the document. The printing device may print a copy of a document. The printing device may reproduce the signature in real time.

The system may store a record of the metaverse interaction. The record may include interactions between the agent avatar and the customer avatar. The record may include dates and times of safe deposit box access. The record may include a document signature.

The record may include technical logs associated with the customer device. The technical logs may include methods of interaction with the customer device and methods for controlling the avatar at the customer device. The stored methods of interaction may be used to authenticate a customer device or a customer avatar. For example, if a user regularly controls an avatar using a virtual reality headset, but later attempts to log in at a laptop using keyboard controls, the system may require additional information to verify identity.

The metaverse application may include a user experience module. The user experience module may manage the environment and determine how the environment appears to the customer and the agent. The user experience module may manage how the interaction between the avatars appears to the customer and the agent.

The metaverse application may include a view engine/controller module. The view engine/controller module may enable the agent to limit customer access to information. Screens or items that are not related to the customer may be visible to the agent but hidden from the customer. The safe deposit box contents may be visible to the customer but hidden from the agent.

The metaverse application may include a session manager module. The session manager module may retain a memory of the interaction between the two digital avatars for the duration of the session. The session manager may generate audit logs to store a record of the interaction for future access.

The metaverse application may include one or more hardware interfaces. Hardware interfaces may mediate between the shared environment and customer or agent devices. Each hardware interface may include a signal interceptor. Each hardware interface may include a signal processor. Each hardware interface may include a signal convertor and action mapper to translate the signals into avatar actions in the metaverse environment.

An added layer on the customer and agent devices may accept user inputs. Illustrative inputs may be touch-based, gesture-based, or stylus-based. The added layer may be haptic enabled.

One or more non-transitory computer-readable media storing computer-executable instructions are provided. When executed by a processor on a computer system, the instructions perform a method for safe deposit box interactions in a metaverse environment.

The method may include, using a metaverse application, maintaining a secure metaverse session that includes a metaverse environment. The method may include authenticating an avatar in the metaverse environment. The avatar may be controlled by input at a user device. The user device may interface with the metaverse application. The authentication may be based, at least in part, on metadata associated with the avatar.

The method may include rendering a digital version of a physical safe deposit box contents in the metaverse environment for viewing by the avatar. The method may include receiving an instruction from the avatar. The instruction may be based on input at the user device. The method may include adjusting a camera located on an interior surface of a physical safe deposit box in response to the instruction.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch-sensitive screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129 but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP, and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone, or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of maintaining a metaverse session, interfacing with devices, managing metaverse interactions, authenticating an avatar, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
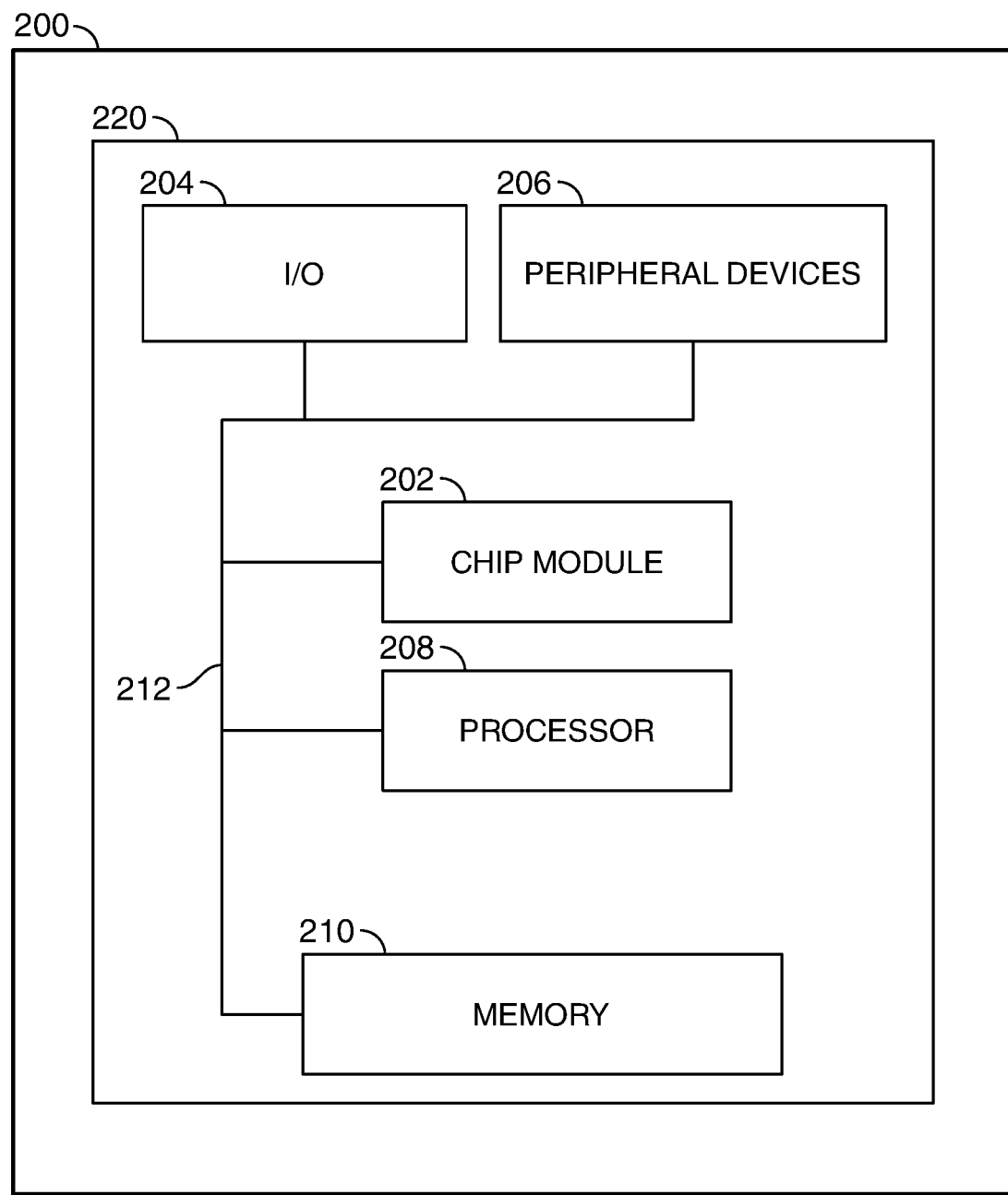
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may maintain a metaverse session, interface with devices, manage metaverse interactions, verify user identity and perform other methods described herein; and machine-readable memory 210.

Machine-readable memory 210 may be configured to store in machine-readable data structures: customer account data, metaverse registration or opt-out, metaverse session audit logs, avatar authentication data, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
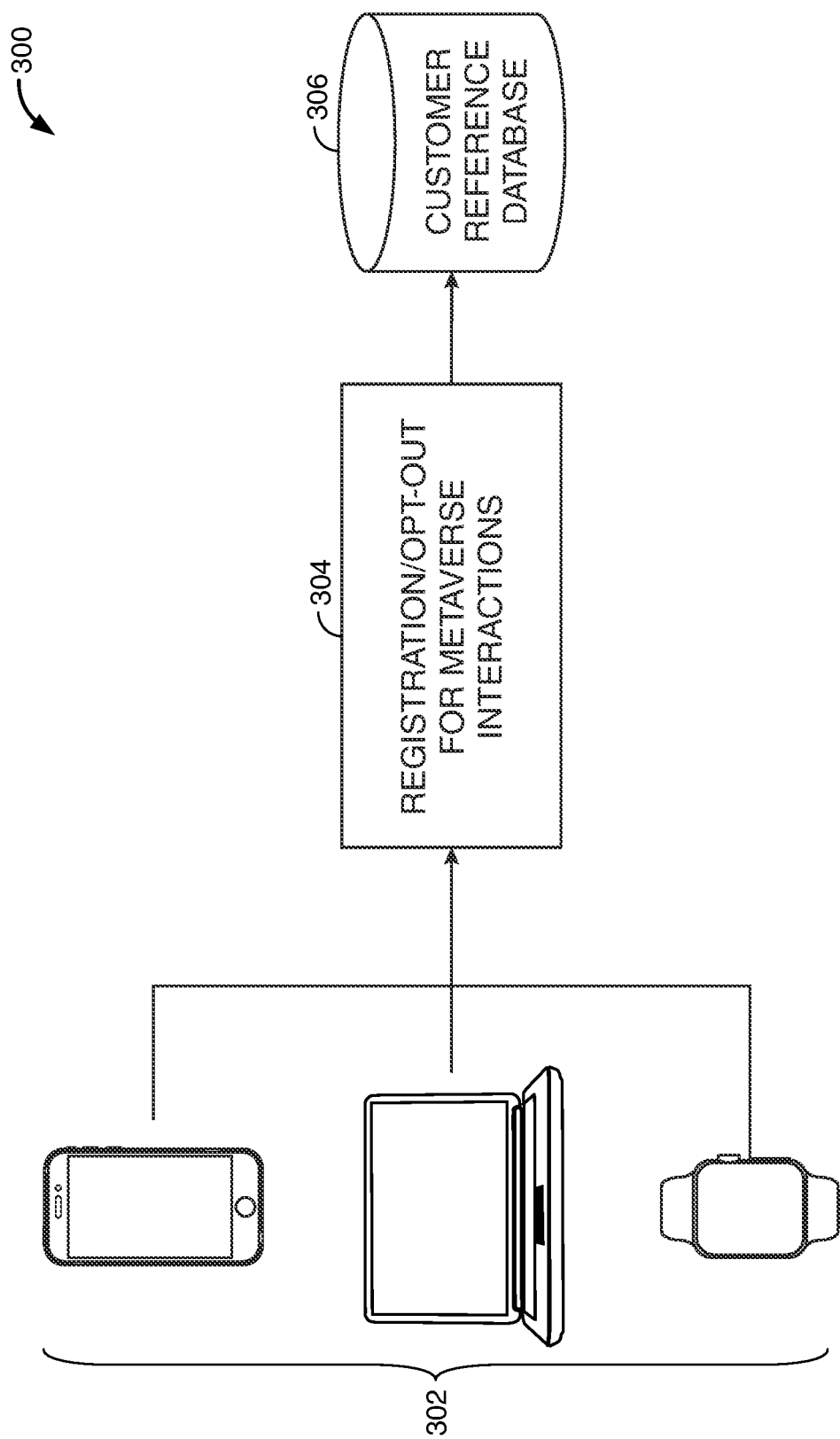
FIG. 3 shows an illustrative process flow in accordance with principles of the disclosure.

FIG. 3 shows process flow 300 for registering for or opting out of metaverse interactions. In some embodiments, registration or opt-out for metaverse interaction with a financial institution may be associated with initiating a financial product or service.

At step 302, registration or opt-out may be initiated at a user device. Illustrative devices are shown; however, any suitable device may be used. Registration or opt-out may be initiated via a mobile application, internet portal, telephone interaction, in-person interaction, or via any suitable method. At step 304, the registration or opt-out may be received and processed. At step 306, registration or opt-out information may be stored in a customer reference database.

Figure 4A:
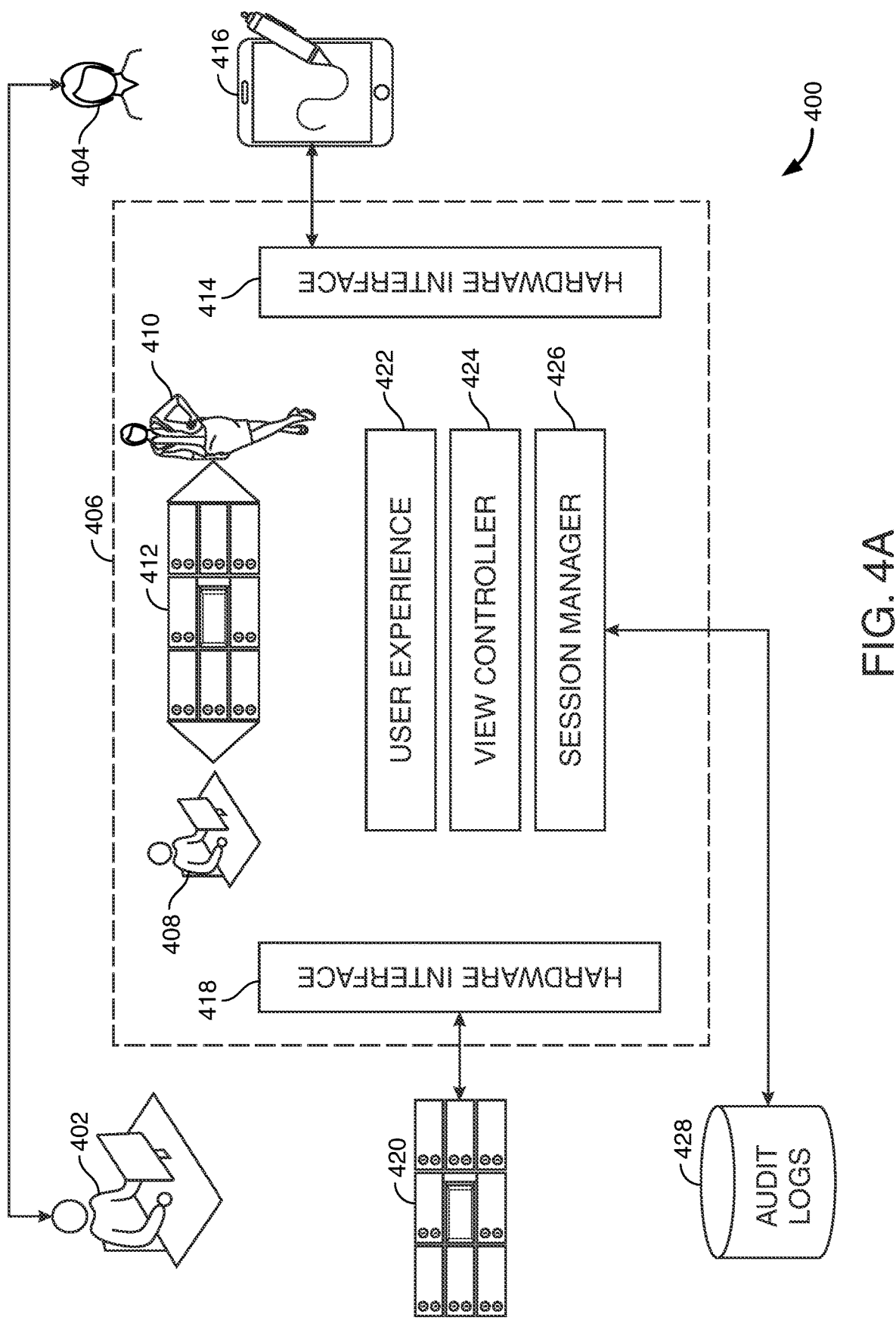
FIG. 4A shows an illustrative process flow in accordance with principles of the disclosure.

FIG. 4A shows a first set of features in illustrative process flow 400 for metaverse session interactions. Agent 402 may transmit a link to customer 404. The link may enable customer 404 to interface with metaverse application 406.

Metaverse application 406 may maintain a metaverse environment. The metaverse environment may simulate a real-world banking environment. In the metaverse environment, agent avatar 408 may interact with customer avatar 410.

Customer 404 may be authenticated prior to accessing the metaverse environment. In some embodiments, customer 404 may be authenticated within the metaverse environment. In some embodiments, customer identity may be verified based on meta-information associated with customer avatar 410.

In the metaverse environment, customer avatar 410 may interact with a virtual representation 412 of physical safe deposit box 420. Virtual safe deposit box 412 may include a digitally rendered version of one or more physical objects stored in box 420. Customer avatar 410 may move or rotate the rendered objects.

In some embodiments customer avatar 410 may view a video or live stream of the interior of a physical safe deposit box within the metaverse session. Authentication of the customer using avatar metadata and the bidirectional metaverse security provide a unique approach to a secure remote viewing experience.

Metaverse application 406 may include hardware interface 414. Hardware interface 414 may interface with customer device 416. Hardware interface 414 may convert customer input at device 416 into metaverse actions controlling customer avatar 410. Device 416 as shown is a mobile device, with input provided using a stylus, but any suitable device and any suitable mode of input may be used.

Metaverse application 406 may include hardware interface 418. Hardware interface 418 may interface with physical safe deposit box 420.

Physical safe deposit box 420 may include cameras to capture images of the content of the box. Hardware interface 418 may convert input at box 420 into metaverse images for customer avatar 410. Hardware interface 418 may convert metaverse actions such as an instruction from a customer avatar 410 into camera adjustments at box 420.

Metaverse application 406 may include user experience module 422. User experience module 422 may determine how the metaverse environment and the interactions between avatars appear to agent 402 and customer 404.

Metaverse application 406 may include view engine/controller 424. View engine/controller 424 may enable agent 402 to control the view of customer 404. Screens or items not related to the customer may not be visible to the customer in the metaverse session. Contents of safe deposit box 412 may not be visible to the agent in the metaverse session.

Metaverse application 406 may include session manager 426. Session manager 426 may maintain the conversation between agent avatar 408 and customer avatar 410 for the duration of the session. Session manager 426 may store audit logs of the session in database 428 for future reference.

Figure 4B:
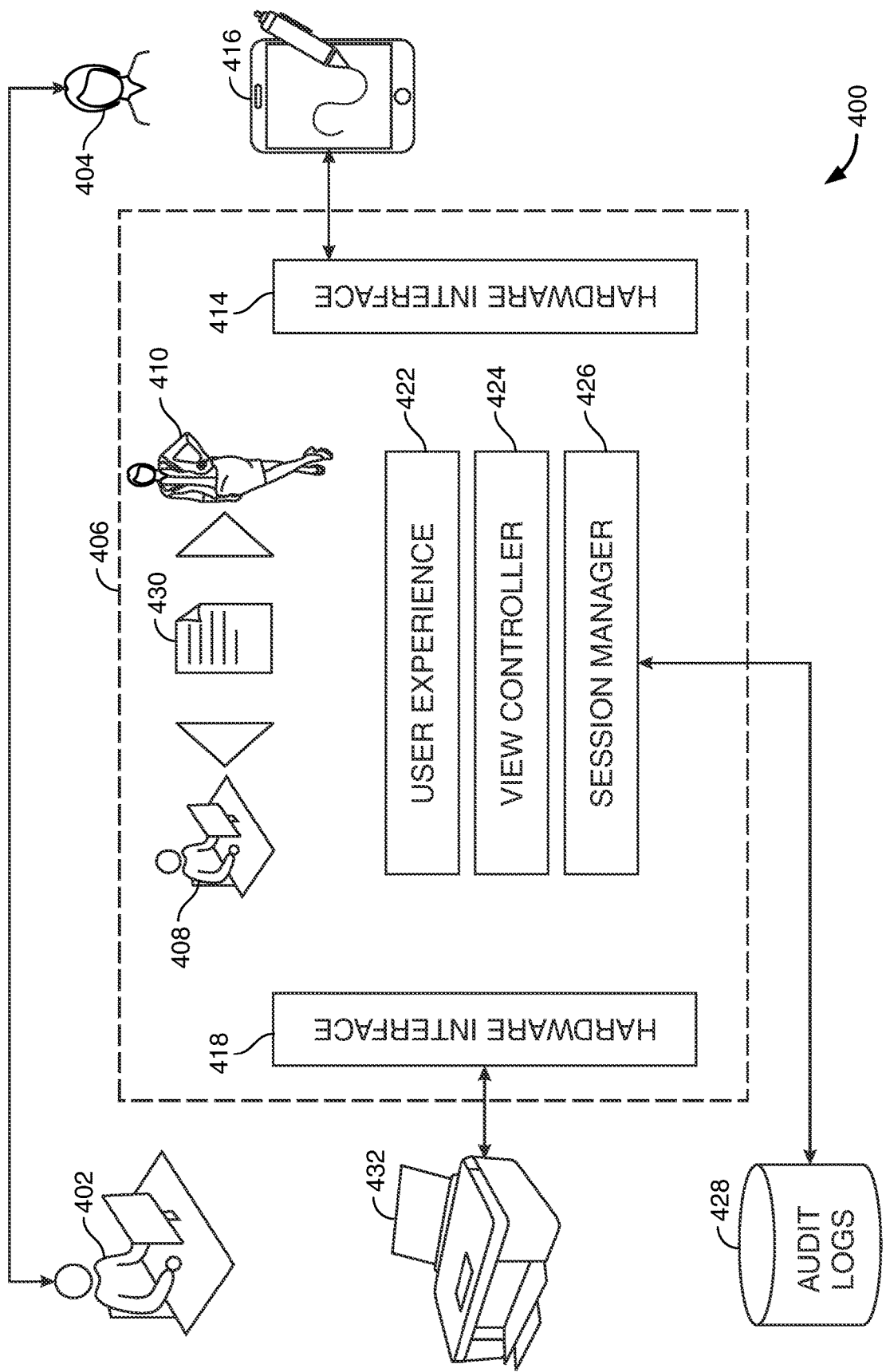
FIG. 4B shows an illustrative process flow in accordance with principles of the disclosure.

FIG. 4B shows a second set of features in illustrative process flow 400 for metaverse session interactions. Elements of FIG. 4B were previously shown in FIG. 4A and described in paragraphs 89-99.

In the metaverse environment, agent avatar 408 and customer avatar 410 may view virtual document 430. Virtual document 430 may be a digital representation of a physical document. Agent avatar 408 may explain the document and request a signature. Customer avatar 410 may provide a signature on the document. Metaverse application 406 may render the signature on the virtual document.

Metaverse application 406 may include hardware interface 418. Hardware interface 418 may interface with printing device 432. Hardware interface 418 may convert metaverse actions such as a signature by customer avatar 410 on virtual document 430 into a printable image.

Figure 5:
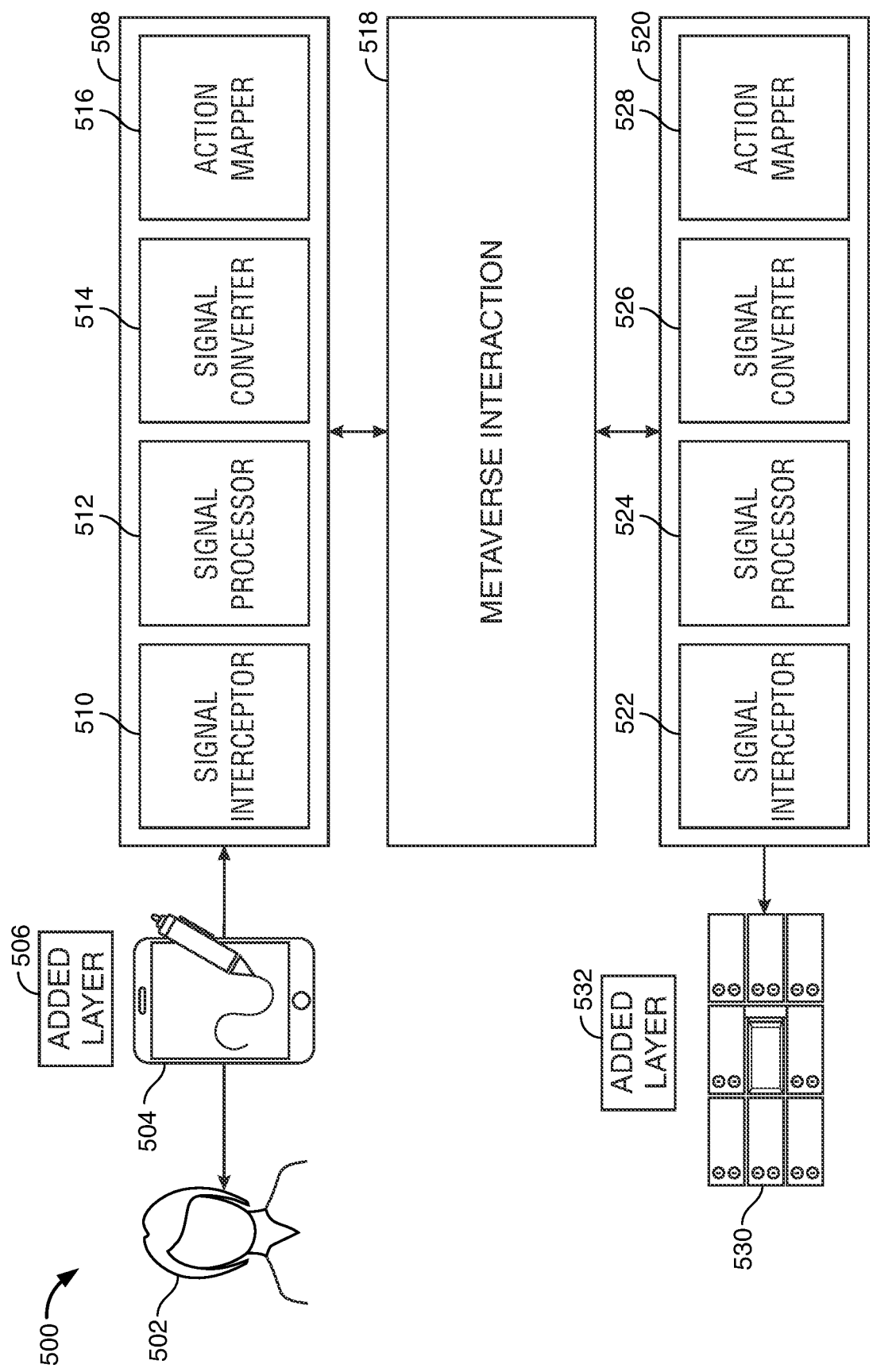
FIG. 5 shows an illustrative process flow in accordance with principles of the disclosure.

FIG. 5 shows process flow 500 illustrating the metaverse application hardware interface. One or more elements of process flow 500 may overlap with elements of process flow 400, shown in FIGS. 4A and 4B.

During a metaverse session, user 502 may provide input at device 504. Device 504 as shown is a mobile device with input provided using a stylus, but any suitable device and any suitable type of input may be used. Added layer on 506 on device 504 may process user inputs. The added layer may be haptic enabled.

Hardware interface 508 may receive and process signals from the device 504. Signal interceptor 510 may receive signals from the device 504. Signal processor 512 may process the signals to understand the user input. Signal converter 514 may convert the input to metaverse instructions. Action mapper 516 may direct avatar actions in the metaverse environment based on the instructions. Hardware interface 508 may correspond to hardware interface 414, shown in FIGS. 4A and 4B.

The metaverse session may include bidirectional interactions 518 between an agent and the device. The agent side may include hardware interface 520. Hardware interface 520 may include signal interceptor 522, signal processor 524, signal converter 526, and action mapper 528. Hardware interface 520 may correspond to hardware interface 418, shown in FIGS. 4A and 4B.

Hardware interface 520 may receive or transmit signals from cameras in physical safe deposit box 530. Cameras at physical safe deposit box 530 may include added layer 532 for interactions with the metaverse session. Cameras at physical safe deposit box 530 may be adjusted based on instructions from an avatar during metaverse interaction 518.

Figure 6:
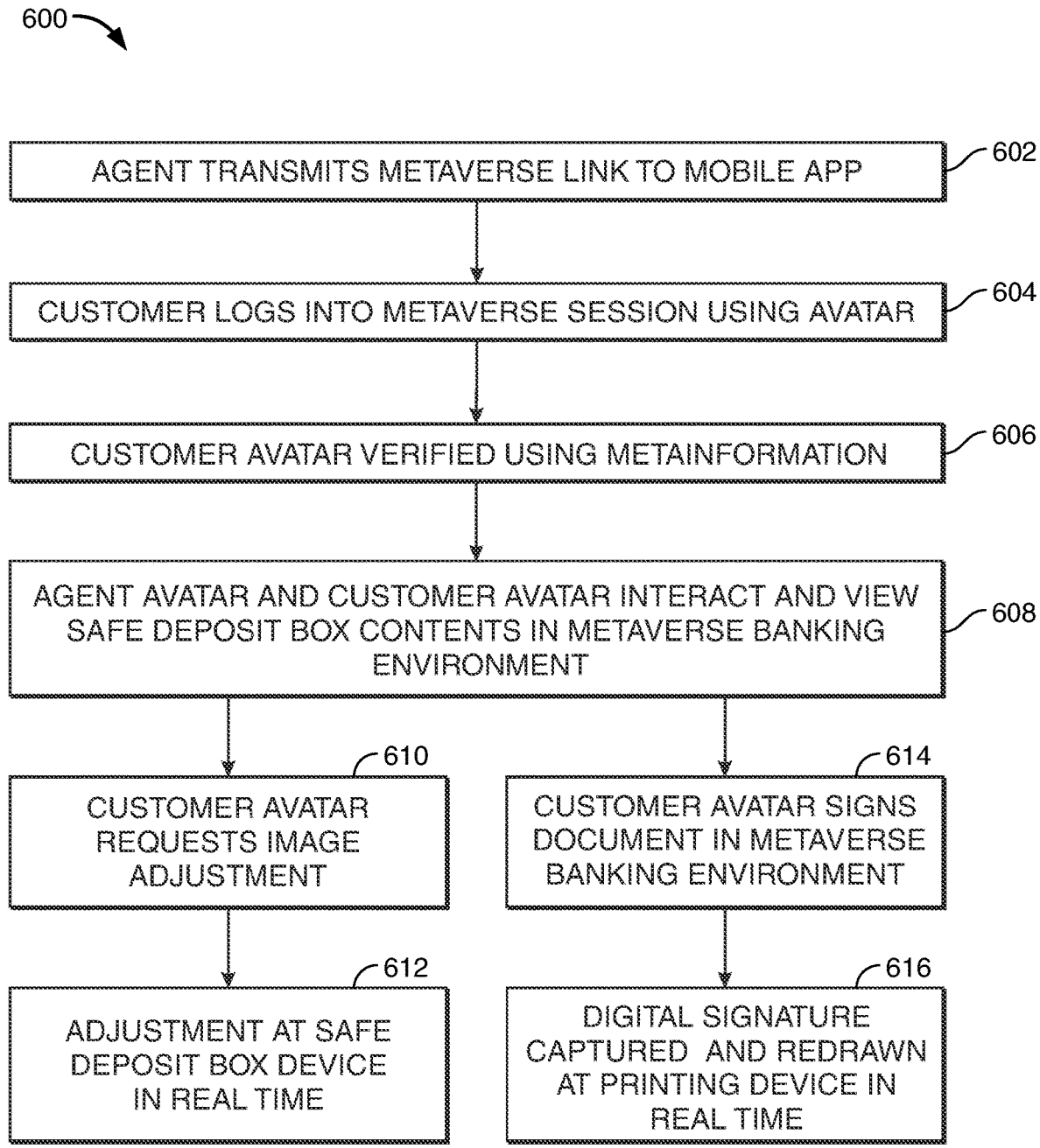
FIG. 6 shows an illustrative process flow in accordance with principles of the disclosure.

FIG. 6 shows process flow 600 for safe deposit box transactions using metaverse interactions. At step 602, an agent may transmit a metaverse link to a mobile application on a customer device. At step 604, the customer may log into the metaverse session using an avatar. The avatar may be a new avatar, a previously used avatar or an avatar that was previously assigned or previously registered.

At step 606, the customer avatar may be verified using meta-information associated with the avatar. For example, features of avatar appearance may be compared to features that have been stored during previous metaverse sessions. In some embodiments, the avatar may be verified based on user device features or on modes of interaction with the user device.

At step 608, and agent avatar and customer avatar may interact within the metaverse environment.

The metaverse environment may include a digital rendering or livestream of safe deposit box contents. At step 610, the customer avatar may request an image adjustment. At step 612, a camera in the physical safe deposit box may be adjusted.

The metaverse environment may include a digital rendering of a document. At step 614, the customer avatar may sign the digital document in the metaverse environment. At step 616, the digital signature may be captured and replicated at a printing device. The printing device may print the customer signature in real time.

Thus, methods and apparatus for a METAVERSE ENHANCED SAFE DEPOSIT BOX. Persons skilled in the art will appreciate that the present invention can be practiced by other than the described embodiments, which are presented for purposes of illustration rather than of limitation, and that the present invention is limited only by the claims that follow.

What is claimed is:

1. A method for safe deposit box protocols in a metaverse environment, the method comprising:
   at a processor running a metaverse application:
      maintaining a secure metaverse session comprising a metaverse environment;
      authenticating an avatar in the metaverse environment, the avatar controlled by input at a user device, the authentication based at least in part on metadata associated with the avatar;
      rendering a first virtual representation of physical content of a safe deposit box in the metaverse environment for viewing by the avatar;
      receiving an instruction from the avatar in the metaverse environment, the instruction based on input at the user device;
      rendering a second virtual representation of the physical content of the safe deposit box in the metaverse environment for viewing by the avatar; and
      storing a record of the metaverse session in a computer memory; and
   at the safe deposit box, adjusting a camera on an interior surface of the safe deposit box in response to the instruction from the avatar.

2. The method of claim 1, further comprising authenticating the avatar based at least in part on a feature of the avatar.

3. The method of claim 1, further comprising authenticating the avatar based at least in part on a parameter associated with control of the avatar.

4. The method of claim 1, the avatar comprising a first avatar and the session comprising a bidirectional metaverse session for an interaction between a first avatar and a second avatar, the first avatar controlled by input at a first user device and the second avatar controlled by input at a second user device.

5. The method of claim 4, further comprising transmitting an invitation from the second user device to a mobile application associated with the first user device, the invitation comprising a link for joining the metaverse session.

6. The method of claim 4, further comprising controlling the metaverse environment to limit viewing access by the second avatar.

7. The method of claim 1, further comprising, at the safe deposit box, adjusting an interior surface of the safe deposit box in response to the instruction from the avatar.

8. The method of claim 1, further comprising preregistering a financial institution account for metaverse interactions.

9. The method of claim 7, further comprising preregistering a device for metaverse interactions regarding the financial institution account.

10. One or more non-transitory computer-readable media storing computer-executable instructions which, when executed by a processor on a computer system, perform a method for safe deposit box protocols in a metaverse environment, the method comprising:
    at a processor running a metaverse application:
       maintaining a secure metaverse session comprising a metaverse environment;
       authenticating an avatar in the metaverse environment, the avatar controlled by input at a user device, the authentication based at least in part on metadata associated with the avatar;
       displaying a live video stream of physical content of a safe deposit box in the metaverse environment for viewing by the first avatar;
       receiving an instruction from the avatar in the metaverse environment, the instruction based on input at the user device; and
       storing a record of the metaverse session in a computer memory; and
    at the safe deposit box, adjusting a camera on an interior surface of the safe deposit box in response to the instruction from the avatar.

11. The media of claim 10, further comprising authenticating the avatar based at least in part on a feature of the avatar.

12. The media of claim 10, further comprising authenticating the avatar based at least in part on a parameter associated with control of the avatar.

13. The media of claim 10, further comprising controlling the metaverse environment to restrict viewing access by parties other than the avatar.

14. The method of claim 10, further comprising, at the safe deposit box, adjusting a light source on an interior surface of the safe deposit box in response to the instruction from the avatar.

15. The media of claim 10, further comprising preregistering a financial institution account for metaverse interactions.

16. The media of claim 10, further comprising preregistering a device for metaverse interactions regarding the financial institution account.

17. A system for safe deposit box protocols in a metaverse environment, based at least in part on authentication of an avatar in the metaverse environment, the system comprising:
    a processor running a metaverse application, the processor configured to:

maintain a secure bidirectional metaverse session comprising the metaverse environment;

authenticate a first avatar in the metaverse environment;

render an interaction between the first avatar and a second avatar, the first avatar controlled by input at a first user device and the second avatar controlled by input at a second user device;

render a digital version of physical contents of a safe deposit box in the metaverse environment for viewing by the first avatar;

receive an instruction from the first avatar in the metaverse environment, the instruction based on input at the first user device;

render a second digital representation of the physical contents of the safe deposit box in the metaverse environment for viewing by the avatar; and store a record of the metaverse session in a computer memory; and a safe deposit box actuator that interfaces with the metaverse application, the actuator configured to adjust a camera on an interior surface of the safe deposit box in response to the instruction from the first avatar.

18. The system of claim 17, the metaverse application configured to authenticate the first avatar based at least in part on a feature of the first avatar.

19. The system of claim 17, the metaverse application configured to authenticate the avatar based at least in part on a parameter associated with control of the avatar.

20. The system of claim 17, further comprising a printing device that interfaces with the metaverse application, wherein:

the processor is further configured to:

render a digital version of a document associated with the safe deposit box for viewing by the first avatar and the second avatar;

render a signature by the first avatar on the digital version of the document, the signature based on input at the first user device; and capture the signature and transmit the captured signature to the printing device; and the printing device is configured to reproduce the signature on a paper version of the document.

21. The system of claim 17, wherein the safe deposit box actuator is a first safe deposit box actuator, the system further comprising:

a second safe deposit box actuator configured to adjust a light source on an interior surface of the safe deposit box in response to the instruction from the first avatar; and a third safe deposit box actuator configured to adjust an interior surface of the safe deposit box in response to the instruction from the first avatar.

* * * * *